US006078913A

United States Patent [19]

Aoki et al.

[11] Patent Number: 6,078,913

[45] Date of Patent: Jun. 20, 2000

[54] DOCUMENT RETRIEVAL APPARATUS

[75] Inventors: Keiko Aoki; Kazunori Matsumoto; Kazuo Hashimoto, all of Saitama, Japan

[73] Assignee: Kokusai Denshin Denwa Co., Ltd., Tokyo, Japan

[21] Appl. No.: 09/022,280

[22] Filed: Feb. 11, 1998

[30] Foreign Application Priority Data

| | | | |
|---|---|---|---|
| Feb. 12, 1997 | [JP] | Japan | 9-041429 |
| Mar. 6, 1997 | [JP] | Japan | 9-067496 |

[51] Int. Cl.[7] .......... C06F 17/21

[52] U.S. Cl. .......... 707/2

[58] Field of Search .......... 707/2, 5, 102

[56] References Cited

U.S. PATENT DOCUMENTS

| | | | |
|---|---|---|---|
| 5,619,709 | 4/1997 | Caid et al. | 707/532 |
| 5,649,193 | 7/1997 | Sumita et al. | 707/103 |
| 5,754,939 | 5/1998 | Herz et al. | 455/4.2 |
| 5,787,422 | 7/1998 | Tukey et al. | 707/5 |
| 5,864,855 | 1/1999 | Ruocco et al. | 707/10 |

OTHER PUBLICATIONS

"Information Agents for the World Wide Web", Davies et al, *BT Technology Journal*, vol. 14, No. 4, Oct. 1996, pp. 105–114.

"An Internet Difference Engine and its Applications", Ball et al, Digest of Papers of Compcon (Computer Science Conference) *1996, Technologies for the Information Superhighway Santa Clara*, No. Conf. 41, Feb. 25, 1996, pp. 71–76.

"Comparison of Hierarchic Agglomerative Clustering Methods of Document Retrieval", El–Hamdouchi et al, *Computer Journal*, vol. 32, No. 3, Jun. 1, 1989, pp. 220–227.

"Recent Trends in Hierarchic Document Clustering: A Critical Review", Willett, *Information Processing & Management (Incorporating Information Technology)*, vol. 24, No. 5, Jan. 1, 1988, pp. 577–597.

"Cluster–Based Text Categorization: A Comparison of Category Search Strategies", Iwayama et al, *Proceedings of the Annual International ACM SIGIR Conference on Research and Development in Information Retrieval*, 1995, pp. 273–280.

"Hierarchial Bayesian Clustering for Automatic Text Classification", Iwayama et al, *Proceeding of IJCAI–95, 1995*, pp. 1322–1327.

"A Probabilistic Model for Text Categorization: Based on a Single Random Variable with Multiple Values", Iwayama et al, *Proceeding of the Conference on Applied Natural Language Proceeding*, 1994, pp. 162–167.

"Application of MDL Principle to Pattern Classification Problems", Itoh, *Journal of Japanese Society for Artificial Intelligence*, vol. 7, No. 4, Jul. 1992, pp. 608–614.

"An Inductive Learning Method and Its Application to Diagonstic Systems", Nakakuki et al, *IPSJ SIG Notes*, vol. 91, No. 3, 91–AI–74, Jan. 1991, pp. 19–28.

*Primary Examiner*—Wayne Amsbury
*Attorney, Agent, or Firm*—Arent Fox Kintner Plotkin & Kahn, PLLC

[57] ABSTRACT

A document retrieval apparatus is connected to a network, and includes a cluster database storing a cluster of node information elements linked for clustering the documents to a hierarchical tree structure based on degree of similarity in all of the documents. The apparatus can post to an end address in the node information element encountered on the way to follow links of the cluster by whenever one of the documents is updated. Also, the apparatus selects a specific number of documents, clusters those, assigns the remaining non-selected documents respectively to a leaf node to be similar to the documents in the cluster, and repeats recursively the above operations toward a direction of the leaf node of cluster.

13 Claims, 12 Drawing Sheets

DOCUMENT RETRIEVAL APPARATUS

FIELD OF THE INVENTION

The present invention relates to a document retrieval apparatus for retrieving desired documents from documents stored in a plurality of computers connected in a network at high speed.

DESCRIPTION OF THE RELATED ART

The conventional document retrieval apparatus has a contents database and a controller. The contents database stores document index information such as an address of the computer with particular documents and a directory in which each of the documents exist. The controller retrieves the documents by using keywords from the contents database.

As a representative example of the document retrieval apparatus, there is a search engine for retrieving the documents from desired documents in WWW (World Wide Web) in the internet. The search engine retrieves and provides addresses of documents in response to keywords specified by a user.

Herein after, for example, the operation of the document retrieval apparatus in the internet is explained.

The conventional search engine retrieves the documents by batch processing from a large number of pieces of document information (an address, keywords, etc.) which have been collected beforehand. In order to realize this, the contents database of the conventional search engine classifies URLs (Uniform Resource Locators) of the documents respectively by using the retrieving keywords.

However, since it is necessary to retrieve a massive number of documents, a large number of URLs corresponds to each keyword. In other words, the URL of a desired document will be buried in the large number of URLs.

In addition, although a plurality of URLs are provided as the retrieving result corresponding to the respective retrieving keyword, the URLs and the keyword have no similarity nor association with each other as for contents in many cases. In such a condition, a user having only a relatively vague limited condition has to repeat the document retrieval operations depending on the keywords only.

In order to solve this disadvantage, there is a method in which a database of a search engine stores a cluster of the URLs classified on a hierarchical tree structure depending upon similarity and association of the document contents. Therefore, a plurality of documents having similarity or association with the desired documents can be provided to an user as the result of retrieving at a high speed.

In order to generate the cluster of this hierarchical tree structure, there is a method in which degrees of similarity in all documents are calculated, and the similar documents are linked closely with each other.

According to this method, first, each document is treated as a single cluster. Then, provided that a cluster c is generated by merging clusters ci and cj, the degree of similarity P (c|ci, cj) is calculated from the word distribution of c and word distributions of ci and cj and an all-document-set is calculated. The clusters are merged according to the similarity. These processes are repeated until all clusters become a single cluster.

In this method, the similarity is calculated so as to be a round robin for all documents. The comparative frequency in this computation is nC2+(n−1)C2+(n−2)C2+ . . .+1. The total calculative quantity of the similarity is O(n3) where n is the informational quantity.

FIG. 6 shows an ideal cluster which is exactly clustered based on similarity and is the minimum code length. The calculative quantity in case of 27 documents as shown in FIG. 1 is 27C2+26C2+ . . .+1, and thus 1730 comparison operations are necessary.

However, the calculative quantity also fairly increases when the number of documents increases. In particular, the search engine which must manage a massive number of documents requires huge times to create the cluster. Also, since this method is a batch generation of the cluster, the round robin calculation of the similarity must be done over again for maintenance (during any update).

Furthermore, the search engine essentially needs a lower level of accuracy in determining similarity of the cluster. It is sufficient for the user having only a relatively vague limited condition to provide URLs of relatively similar documents.

Contrary to this, since the search engine requires a large amount of real-time to update and retrieve documents, it may be necessary to use a clustering method which operates at high speed but decreases somewhat the precision of the similarity.

In addition, since the conventional search engine is a client/server system which just returns a response to a request of a client, if the desired document is added or updated, a user cannot know it unless accessing the document.

An user sometimes hopes to know in real-time only the change under a relatively vague limited condition from the massive number of information sources such as WWW which is always changing. Concretely, the user can watch the change of the desired documents by posting any addition and update in real-time in the documents which have the similarity and the association, to the user.

SUMMARY OF THE INVENTION

Thus, an object of the present invention is to provide a document retrieval apparatus which can generate a cluster of a massive number of documents by a low calculative quantity, and can update the documents while keeping a form of the cluster.

Another object of the present invention is to provide a document retrieval apparatus whereby a plurality of suitable documents can be provided, and any addition and update of the individual documents can be known by the user in real-time.

The present invention provides a document retrieval apparatus connected to a plurality of computers with documents through the network, the apparatus including a contents database storing each index information of a plurality of documents, and a control unit for retrieving documents by URL by means of the contents database by at least one of the retrieval keywords or a retrieval document, the apparatus comprising a cluster database storing a cluster of a plurality of node information element linked for clustering the documents to a hierarchical tree structure based on degree of similarity in all documents, the node information element having the posted end addresses to be posted when the documents positioned to the lower layer of the node information element is updated, the control unit posted to the posted end address in the node information element encountered on the way to follow links of the cluster by means of the cluster database when the document is updated.

According to an embodiment of the invention, the degree of similarity is calculated by weighting with the structure of the document and the occurrence frequency of a keyword in the document, the cluster being executed by linking the similar documents closely with each other based on degree of similarity.

According to an embodiment of the invention, the node information element has a frequency table listed by weighting with keywords based on the degree of similarity.

According to an embodiment of the invention, the control unit follows links of the node information element by comparing at least one of the retrieval keywords or a frequency table of a retrieval documents with the frequency table in the node information element, and posts URLs of documents positioned in a lower layer of the node information element.

According to an embodiment of the invention, the posted end address of the node information element is an inherent address in the network.

According to an embodiment of the invention, the apparatus further comprises a user information database which includes a list of inherent addresses of the documents which are of interest to the user in the network, a domain list indicating retrieving limits of the respective inherent addresses, the number of documents to be shown as a result of the retrieving, and an inherent address of the user in the network, with the posted end address of the node information element being an identifier of each user.

According to an embodiment of the invention, the apparatus further comprises a resource discovering engine for collecting the documents automatically though the network.

The present invention provides a document retrieval apparatus including a database storing a plurality of documents, and a control unit for retrieving and updating a document by means of the database, the control unit comprising; a leaf node selection unit for selecting the specific number of documents from the documents assigned to the leaf node and clustering the selected documents, a partial cluster generation unit for assigning non-selected documents respectively to a leaf node to be similar the documents in the cluster; and a recursively clustering unit for indicating to repeat recursively the operations of the leaf node selection unit and the cluster generation unit toward a direction of the leaf node of cluster.

According to an embodiment of the invention, the leaf node selection unit comprises unit for selecting the specific number of the documents from all of the documents to be assigned to the leaf node, unit for generating the cluster from the selected documents, unit for assigning the remaining non-selected documents respectively to a leaf node to be similar the documents in the cluster, and unit for calculating the code length of the cluster, the leaf node selection unit repeating at a specific frequency these steps, and selecting the specific number of documents of minimum code length.

According to an embodiment of the invention, the code length of the cluster is the sum of the informational quantity $L_1=2k-1$ which is necessary for generating the cluster where k is the number of the leaf nodes, and the code length $L_2=\Sigma ni \log pi$ which is necessary for classifying the documents assigned to each leaf node where ni is the number of the documents assigned to the leaf node and $pi=ni/\Sigma j\ nj$ is a probability of selecting the documents of the leaf node i from all documents.

According to an embodiment of the invention, the recursively clustering unit is directed to repeat recursively the operations of the leaf node selection unit and the partial cluster generation unit in a direction of the leaf node of the cluster if the number of documents assigned to the leaf node of the cluster is more than the specific number.

According to an embodiment of the invention, the documents are arranged by linking the most similar documents closely while keeping a form of the cluster when one of the documents of the cluster is updated.

The present invention provides a document retrieval method for retrieving and updating individual documents of a plurality of documents, the method comprising; a leaf node selection step of selecting a specific number of the documents from all of the documents assigned to the leaf node; a partial cluster generation step of assigning non-selected documents respectively to a leaf node to be similar the documents in the cluster; and a recursively clustering step of recursively repeating the leaf node selection step and the cluster generation step toward a direction of the leaf node of cluster.

According to an embodiment of the invention, the leaf node selection step comprises a step of selecting the specific number of the documents from all of the documents to be assigned to the leaf node, a step of generating the cluster from the selected documents, a step of assigning non-selected documents respectively to a leaf node to be similar to the documents in the cluster, and a step of calculating the code length of the cluster, the leaf node selection step repeating at a specific frequency these steps, and selecting the specific number of documents of minimum code length.

According to an embodiment of the invention, the code length of the cluster is the sum of the informational quantity $L_1=2k-1$ which is necessary for generating the cluster where k is the number of the leaf nodes, and the code length $L_2=\Sigma ni \log pi$ which is necessary for classifying the documents assigned to each leaf node where ni is the number of the documents assigned to the leaf node i and $pi=ni/\Sigma j\ nj$ is a probability of selecting the documents of the leaf node i from all documents.

According to an embodiment of the invention, the recursive clustering step recursively repeats the leaf node selection step and the partial cluster generation step toward a direction of the leaf node of the cluster if the number of documents assigned to the leaf node of the cluster is more than the specific number.

According to an embodiment of the invention, the documents are arranged by linking the most similar document closely while keeping a form of the cluster when an individual document of the cluster is updated.

Further objects and advantages of the present invention will be apparent from the following description of the preferred embodiments of the invention as illustrated in the accompanying drawings.

BRIEF DESCRIPTION OF THE DRAWINGS

FIG. 3 which is constituted by combining

FIG. 5 which is constituted by combining

DESCRIPTION OF THE PREFERRED EMBODIMENTS

Figure 1:
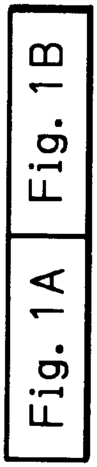
FIG. 1 which is constituted by combining
Figure 1A:
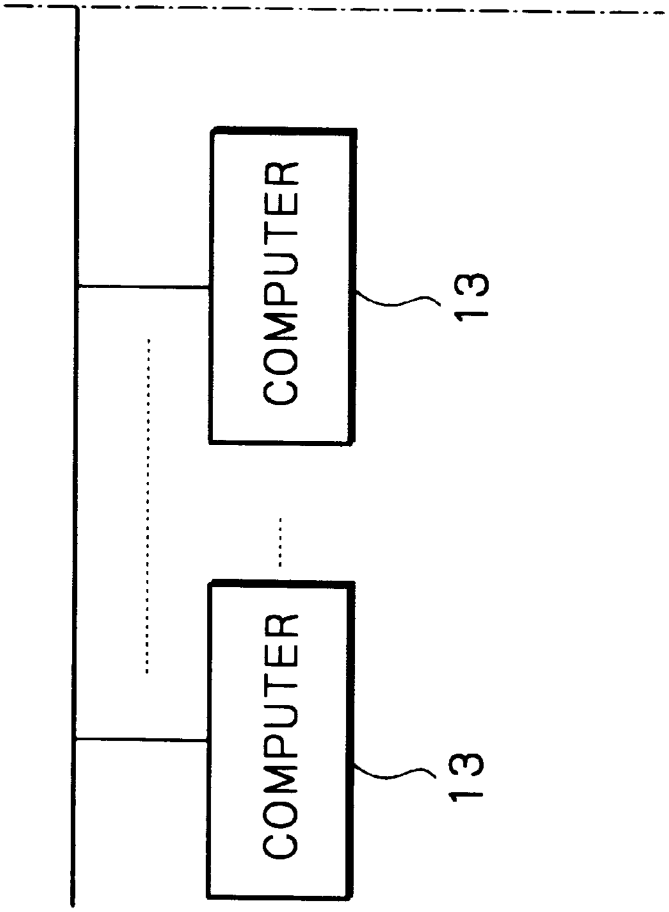
FIG. 1A and 1B shows a block diagram of the document retrieval apparatus according to a preferred embodiment of the present invention.
Figure 1B:
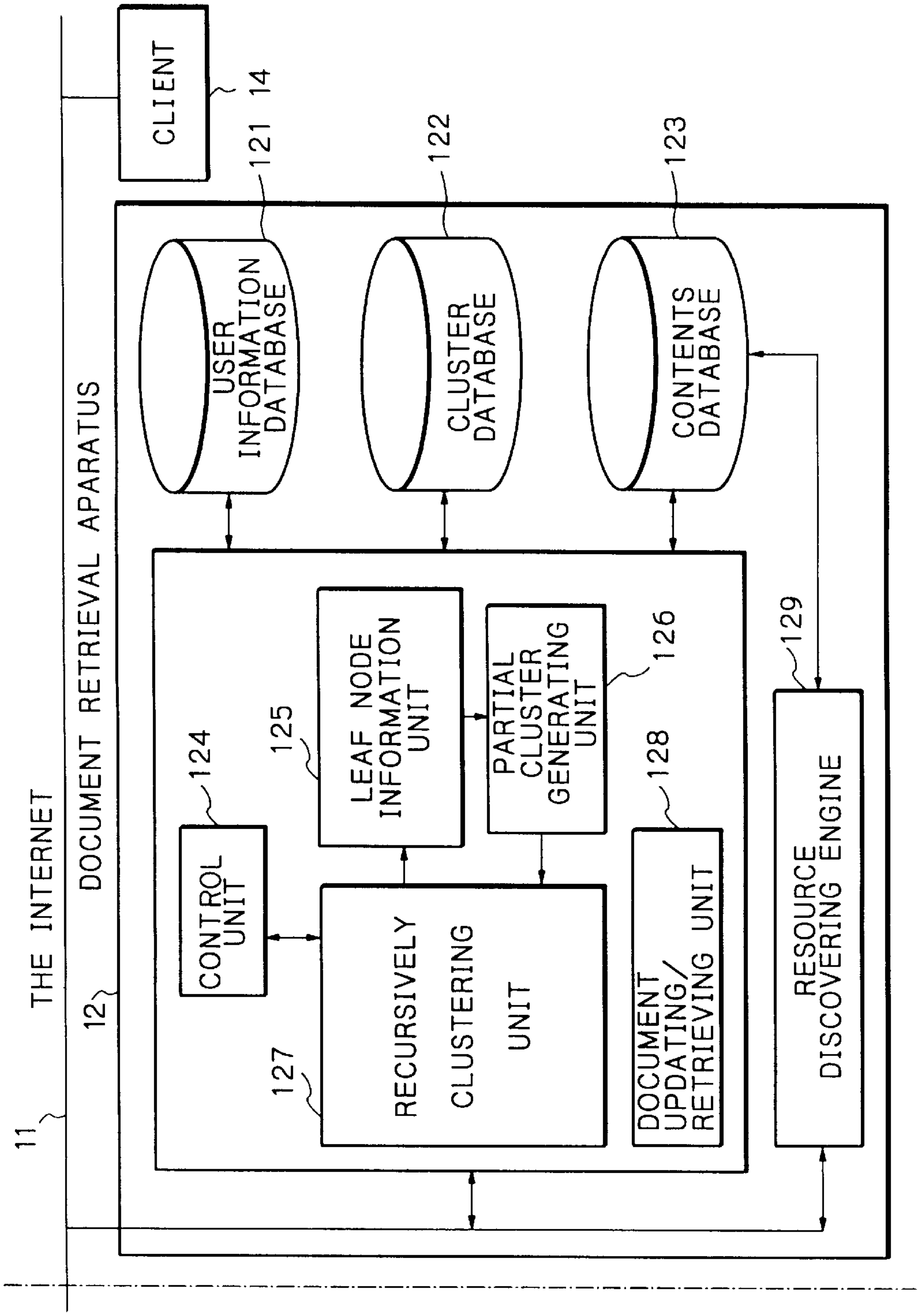

As shown in FIG. 1, a document retrieval server or a document retrieval apparatus 12 is connected to a massive number of computers 13 with documents or pages through the internet 11. The document retrieval server 12 collects and stores addresses of the documents which are in the computers 13, and provides URLs of the desired documents to a client 14 as the retrieved result.

The server 12 includes a user information database 121, a cluster database 122, a contents database 123, a control unit 124, a leaf node selection unit 125, a partial cluster generating unit 126, a recursively clustering unit 127, a document updating/retrieving unit 128 and a resource discovering engine 129.

The contents database 123 and the control unit 124 in this embodiment can be constituted by a conventional database and a conventional control unit in a typical search engine.

The contents database 123 stores document index information for each URL of the document. The document index information contains the title of each of the documents, keywords related to the contents of each of the documents and URL list linked to the documents.

The control unit 124 controls the units to generate the cluster, and retrieves the documents by using the URLs from the contents database 123.

The leaf node selection unit 125 selects optimum documents of the specific number from a large number of documents.

The partial cluster generating unit 126 generates the cluster from a generated documents selected by the leaf node selection unit 125, and assigns the remaining non-selected documents respectively to another leaf node to be similar the documents in the generated cluster.

The recursively clustering unit 127 instructs the repeating of the operations of the leaf node selection unit 125 and the partial cluster generating unit 126 toward a direction of the leaf node of the generated cluster.

The document updating/retrieving unit 128 is provided to add a document to the cluster and to update an individual the document, or retrieves documents from the cluster.

The contents database 123 is also connected with the resource discovering engine 129. The engine 129 which is in general called as "ROBOT" automatically collects the document index information through the internet 11, and stores the document index information into the contents database 123. Thus, the addition and the update of individual documents in the cluster can be automatically and unperiodically detected.

Figure 2:
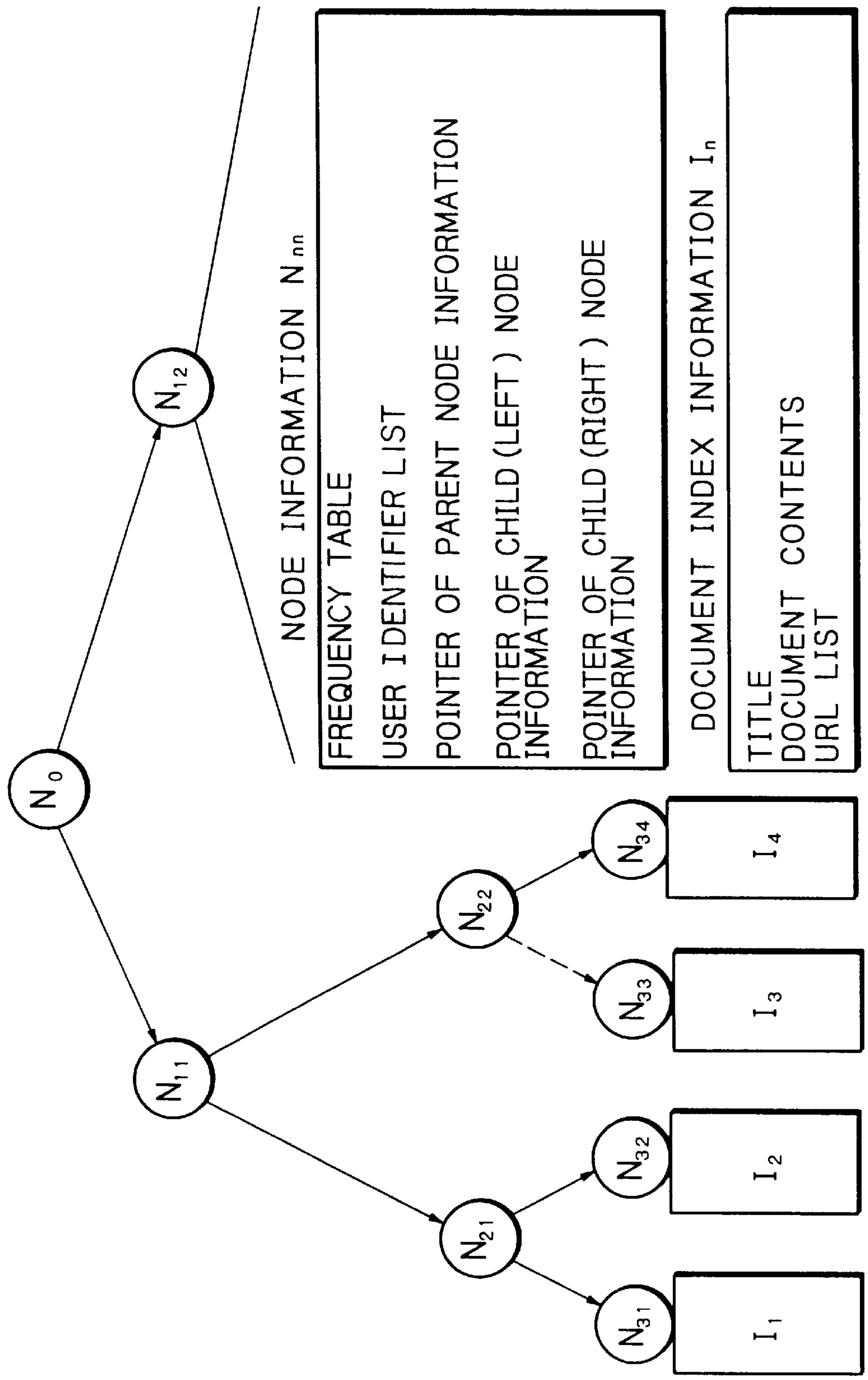
FIG. 2 shows a hierarchical tree structure diagram of the node information element according to the embodiment of FIG. 1.

As shown in FIG. 2, in the cluster database 122, a plurality of node information elements N which form nodal points of hierarchical tree structure are stored. The node information elements N each contain a frequency table 12 and contents for each node, a user identifier list, and pointers indicating parent and child nodes.

The frequency table of keywords lists keywords with weighting the documents based on the degree of similarity. The order of priorities is in a descending order of weighting points. The weighting points are the points counted by weighting the structure of the document and the occurrence frequency of the keywords.

The frequency table is created as follows. First, the documents are cut down by limited keywords of a noun and an undefined word from entire text resource of a document by units of morphological analysis. Then, the keywords are weighted. The weighting is reflected by not only the occurrence frequency of the keywords, but also the tag structure of HTML (Hyper Text Makeup Language) text source. Thus, the frequency table showing a characteristic of the document can be provided.

The weighting with keywords in the frequency table of the node information element is sure to reflect the all documents positioned in a lower layer of the node. The retrieving keywords are compared with the frequency tables of the child nodes, and a route passing through a child node having the high frequency table similarity is selected. Thus, a cluster with high similarity can be generated.

The user identifier list stores the user identifiers to be posted when the documents positioned in a lower layer of the current node are individually updated. The user identifiers are the keys of the user information database. Instead of the user identifiers, posted end addresses of users i.e. the mail addresses maybe stored. The different user identifiers may correspond to a same mail address.

A pointer which indicates the parent node and the child node is necessary to implement the clustering of documents in a hierarchical tree structure. The parent node can select one of right and left child nodes.

The user information database 121 stores original information for each user, corresponding to the user identifier list of the node information element N. In one case, the user identifiers may be constituted by the mail addresses of users. However, by additionally storing various user identifiers and treating them as the keys of the database, various advantage services may be provided. The user information database includes, for each user, a plurality of URLs and Bookmarks which interest the user, a domain list indicating the retrieving limits, the number of URLs of the retrieving result, and a mail address of the user in the network. As soon as the document indicated by the specific URLs and Bookmarks is updated, this update can be posted to the specific user. Also, the retrieving range can be limited by the domain list. Furthermore, a display of the number of URLs as a result of the retrieving may be advantageous for preventing wasteful retrieving.

Figure 3A:
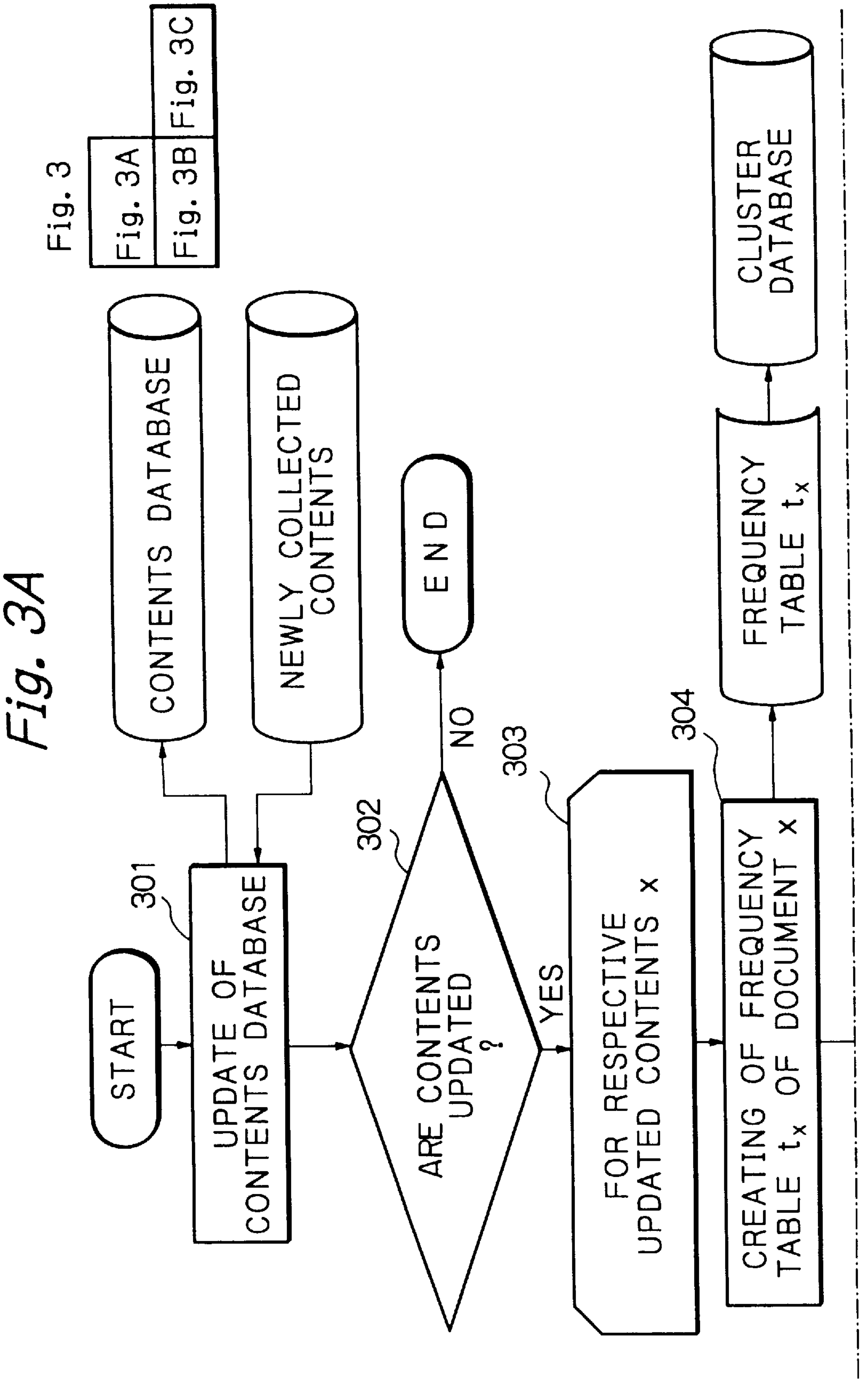
FIG. 3A, 3B and 3C shows a flowchart for posting to the posted end addresses according to the embodiment of FIG. 2.
Figure 3B:
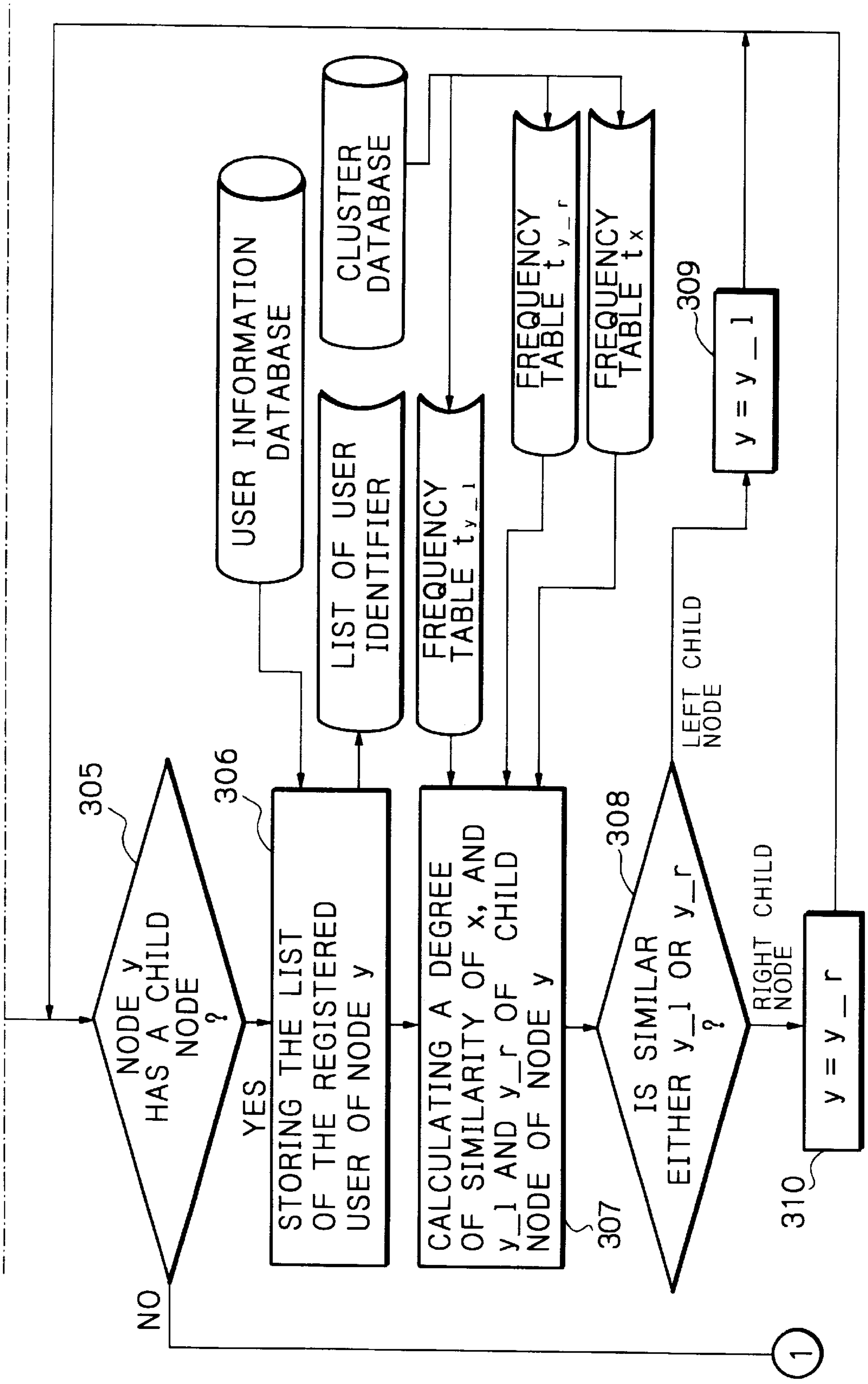
Figure 3C:
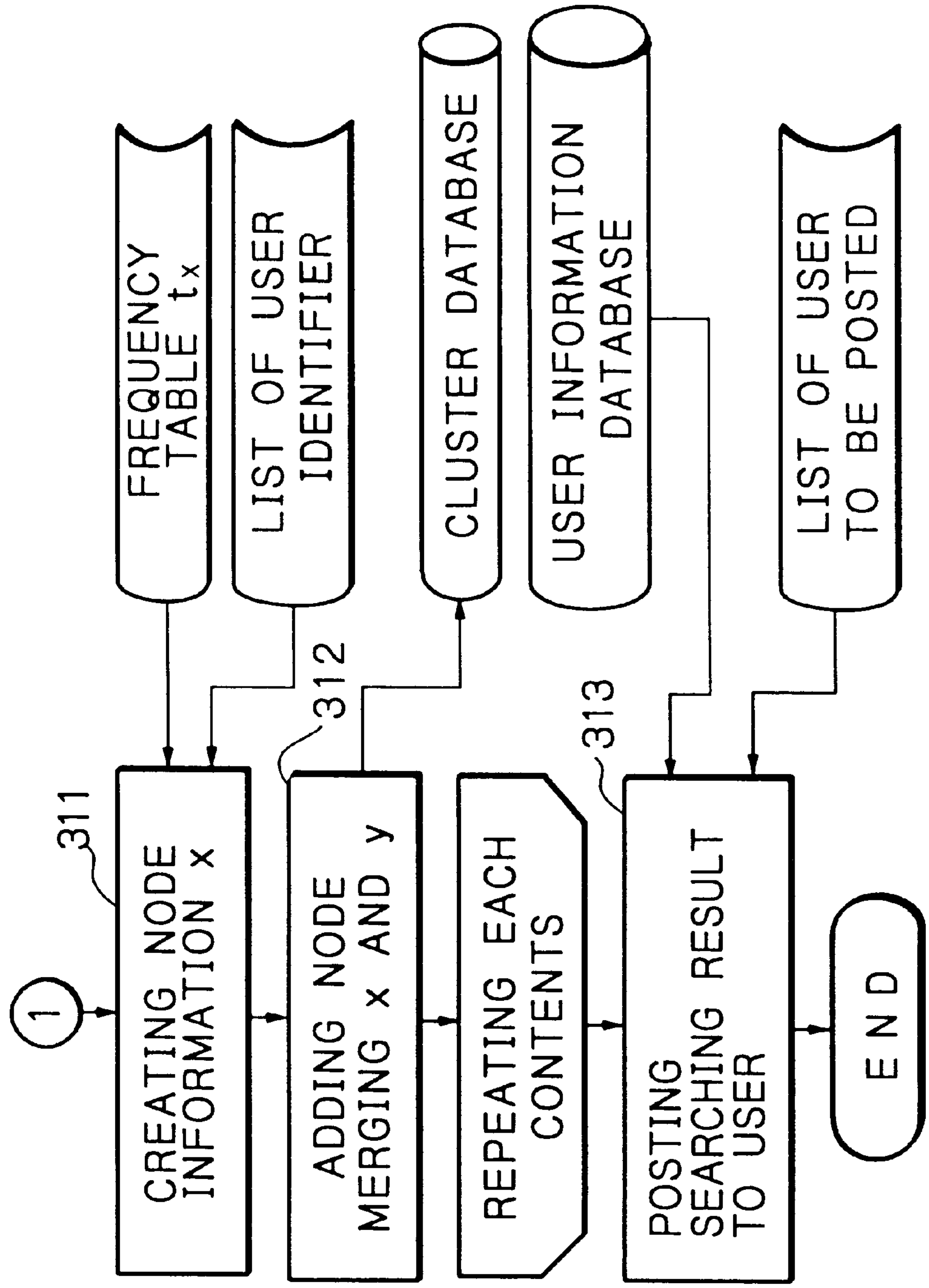

As shown in FIG. 3, the resource discovering engine 129 automatically collects document index information though the internet 11. The collected document index information is stored in the contents database 123 to track any update the contents of any of the documents of the database (step 301). If the none of the documents of the contents are updated (step 302), the process ends. Whereas if the contents of any of the documents are updated, the following steps are carried out for those contents x (step 303).

A frequency table tx is created from the entire text of the document x (step 304), and is stored in the node information element Nx in the cluster database 122. Then, the retrieving and update operation for the cluster is executed by comparing the frequency table tx with the frequency tables of the left and right child node information elements in the order starting from the root node information element NO.

According to the operation, first, it is judged whether the node Ny (NO is at first) at the current retrieving position has a child node (step 305). If the node Ny has no child node, the node information element Mx of the documents x is created by storing the user identifier list and the node pointer (step 311). A parent node is generated newly, and the node Nx and node Ny are merged as the child node of the parent node (step 312). The user is specified in this user identifier list as having an interest in the document positioned in a lower layer of the node information element Ny.

If the node information element Ny at the current retrieving position has a child node, the user identifier list stored in the node information element Ny is added to the user identifier list of the node information element Mx (step 306). The next step is comparing the node Nx with node Ny_I and comparing the node Mx with node Ny_r. That is to say, the step is comparing the frequency table tx with the frequency table ty_1 and the frequency table t0 of the root node, and comparing tx with ty_r and t0. Then, it is judged whether the document x is more similar to either the node Ny_I or Ny_r (step 307, step 308). The node information element Ny traces the link of the similar child nodes (step 309, step 310).

The above-mentioned operations are repeated until the node information element Ny contains no child node. Then, the node information element Mx is created by storing the user identifier list and the node pointer (step 311), and a parent node is newly generated. The node Mx and node Ny are merged as the child node of the parent node (step 312).

When the number of documents positioned under the current node information element is greater or equal to the desired number of documents for the particular user, the apparatus can post the document index information positioned in a low layer of the current node information element.

Finally, any update of the document x is posted to the user corresponding to the user identifier in the user identifier list in the node information element Nx (step 313). In this method, all users interested in the document can be informed of the update of the document x.

The cluster is generated by a leaf node selection step, a partial cluster generation step, a recursively clustering step and a document updating/retrieving step. Hereinafter, those process steps will be explained in detail.

Figure 4:
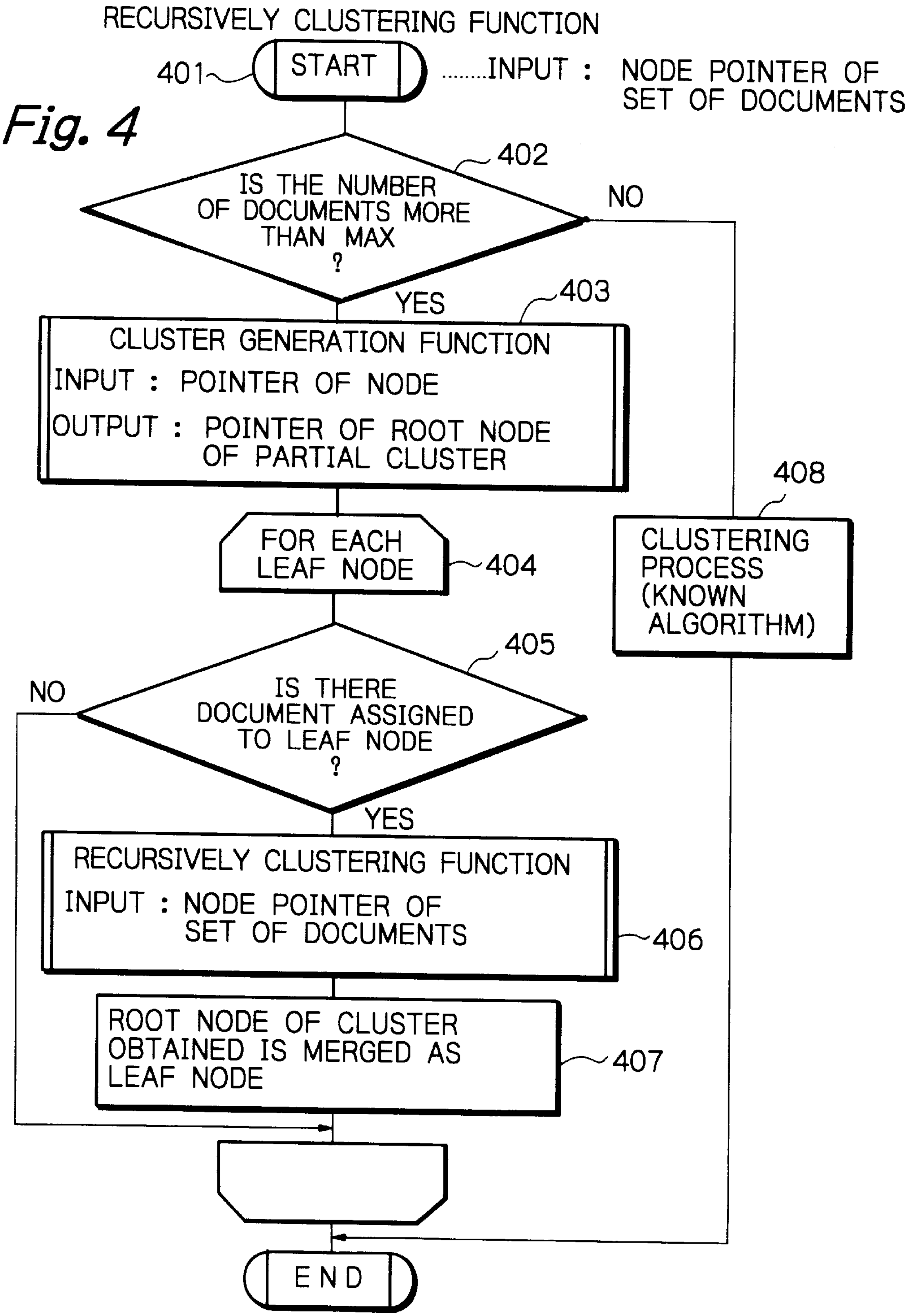
FIG. 4 shows a flowchart of the recursively clustering step according to a preferred embodiment of the present invention.

As shown in FIG. 4, the recursively clustering step is similar to the conventional recursively function for retrieving a binary tree. The input argument of the step is a node pointer indicating a set of documents (step 401). The input argument is a root node pointer assigning a set of all documents.

First, the number of documents assigned to the node of the input argument is judged (step 402). If the number of documents is more than a predetermined number MAX, the cluster positioned in a lower layer of the current node is generated by the following cluster generation function (step 403). While if the number of documents is not more than the MAX, the cluster positioned in a lower layer of the current node is generated by the conventional round robin clustering algorithm (step 408).

The cluster generation function generates the cluster positioned in a lower layer of the input node pointer. The function outputs the root node pointer of the generated partial cluster.

Then, the cluster is generated by recursively calling each leaf node in the partial cluster (step 404). Then, it is judged whether there is any document assigned to a ceratain leaf node (step 405). If there is a document, the self-function is called recursively (step 406), and the clustering is performed toward a direction of the leaf node of the cluster. Then, the root node of the cluster obtained by the recursively clustering function is merged into the cluster positioned in a upper layer as a leaf node (step 407).

Figure 5A:
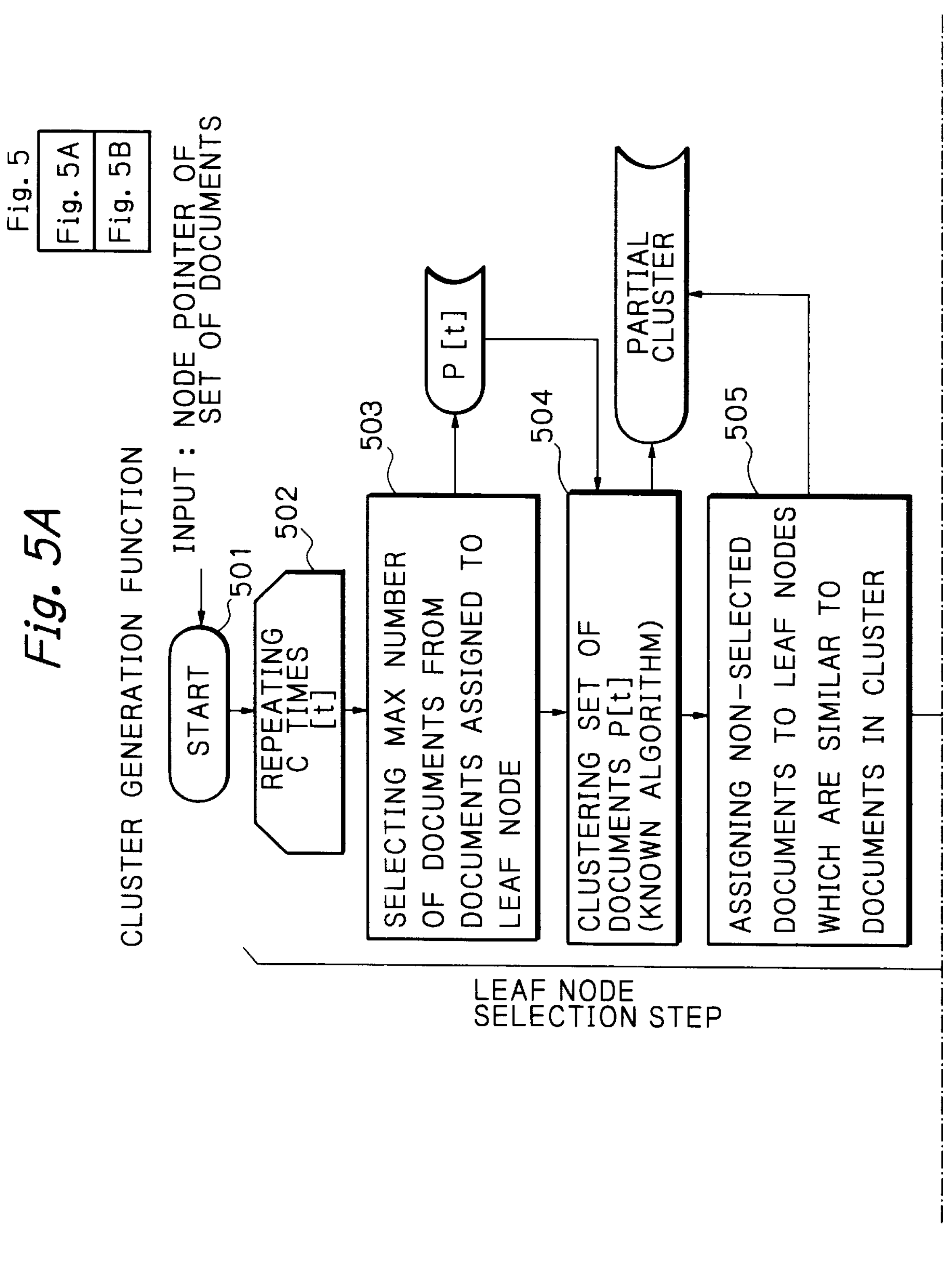
FIG. 5A and 5B shows a flowchart of the cluster generation step according to the embodiment of FIG. 4.
Figure 5B:
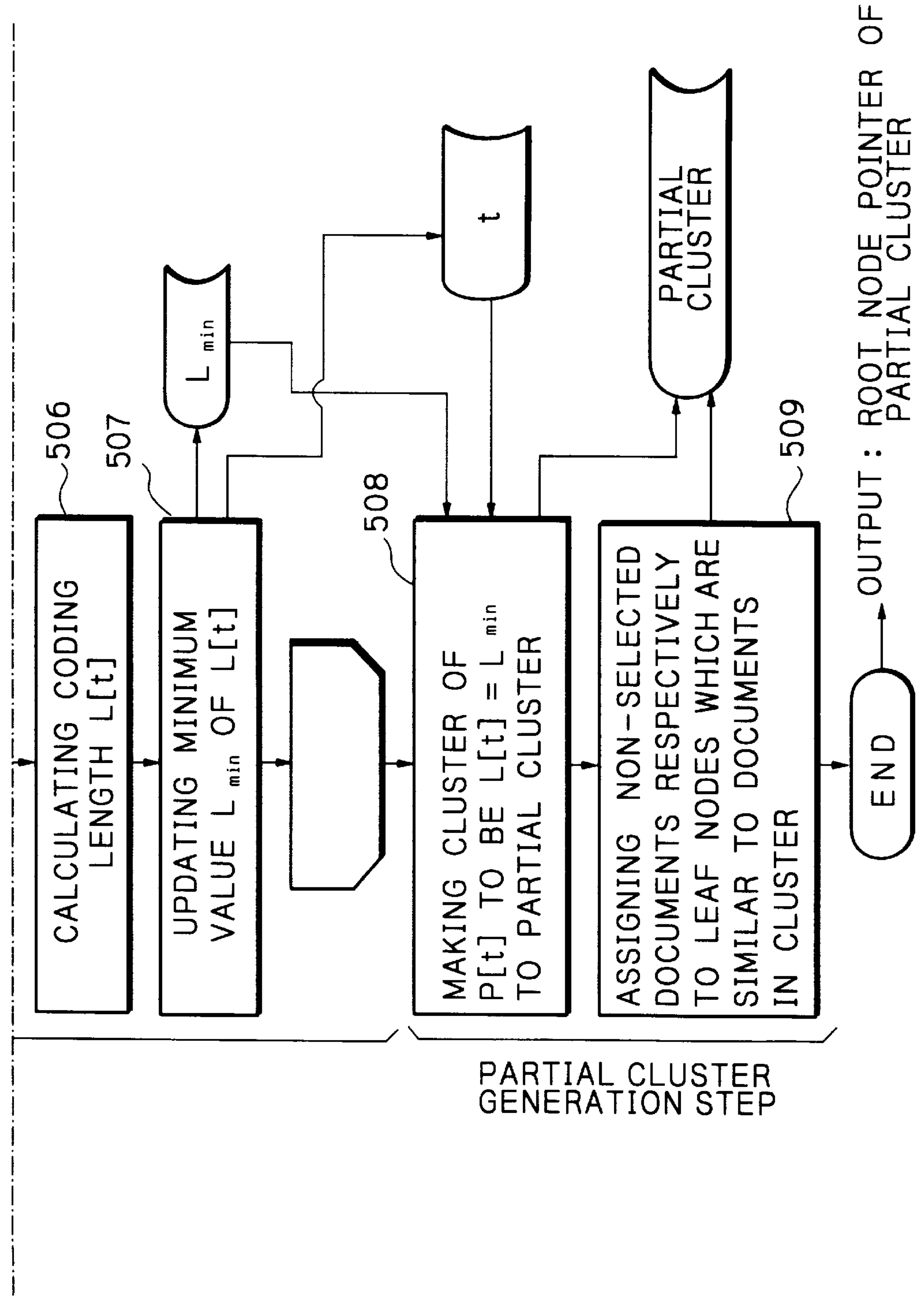
Figure 6:
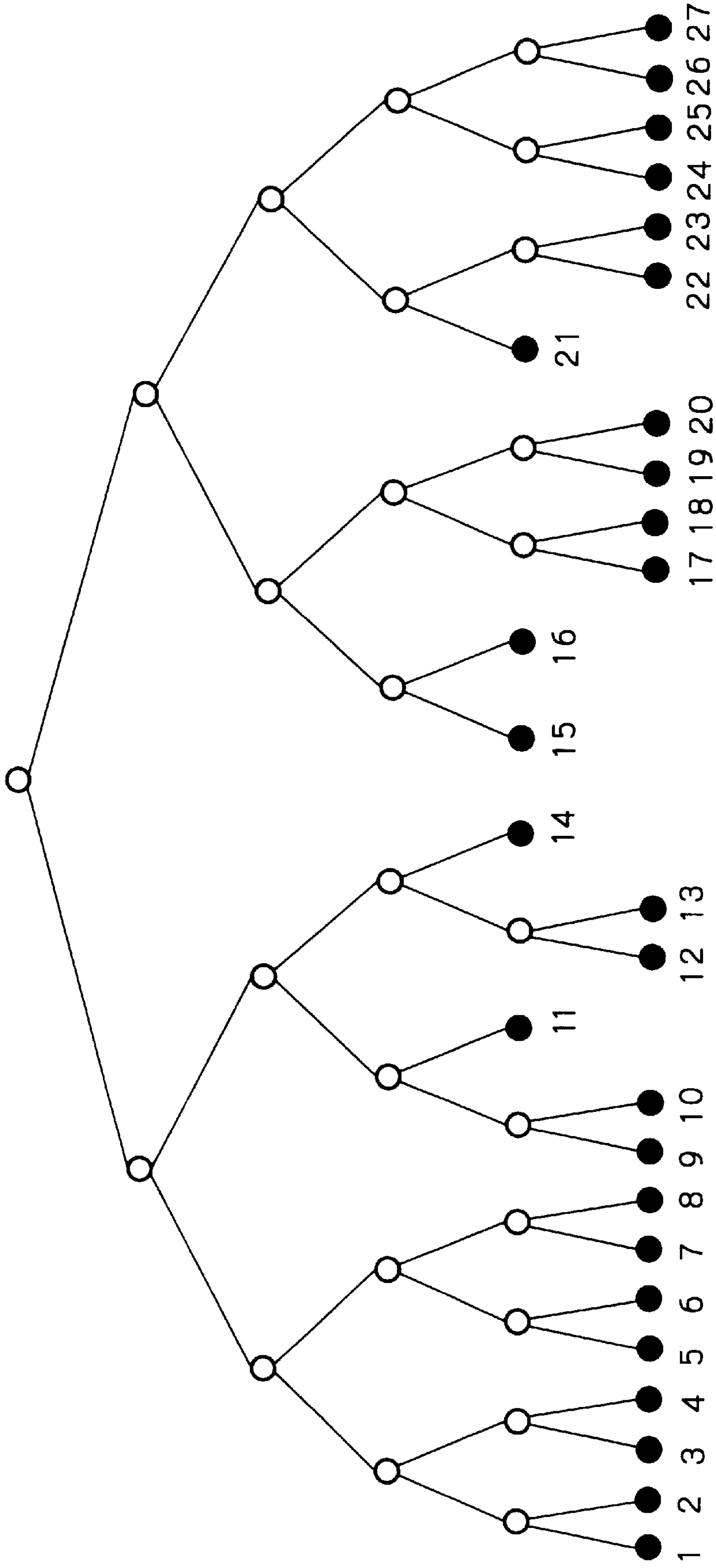
FIG. 6 shows an ideal cluster diagram in exactly order of the similarity.

As shown in FIG. 5, the cluster generation function is roughly divided into a leaf node selection step and a partial cluster generation step. The leaf node selection step selects the specific number of optimum documents for the minimum code length. The partial cluster generating step generates the cluster from the documents selected by the leaf node selection step, and assigns the remaining non-selected remaining documents to a leaf node which is similar to the documents in the cluster.

The input argument of the function is a node pointer indicating a set of documents (step 501). First, a set P[t] of the MAX number documents are selected from the set of documents assigned to the input node pointer (step 503), where t is incremented whenever the sequential steps are repeated. When the cluster generation function is called, at least MAX documents will be assigned to its input node pointer.

Then, the set P[t] of the selected documents are clustered by the conventional known algorithm (step 504). The calculative quantity will not considerably increase since the clustering is executed so that the similarity in MAX documents is judged in round robin.

Then, non-selected remaining documents are assigned to a leaf node which is similar to the documents in the generated cluster (step 505).

Then, the code length Lit] of the generated cluster is calculated (step 506). The set of documents are selected based on MDL (Minimum Description Length) criterion so that the code length of the classified result in minimized. The code length L is the sum of the informational quantity $L_1$ of the node which is necessary for generating the cluster, and the code length $L_2$ which is necessary for classifying the documents assigned to each leaf node.

The number of non-terminal nodes $L_1$ which is necessary for generating the cluster is equal to 2k−i, where k is the number of the leaf nodes.

The code length $L_2$ which is necessary for classifying the documents assigned to each leaf node is $\Sigma ni \log pi$, where ni is the number of documents assigned to the leaf node i, and $pi=ni/\Sigma j\ nj$ is a probability of selecting the documents of the leaf node i from all documents.

Thus, the code length L of the cluster is calculated by $L_1+L_2$.

Then, the calculated code length L is compared with the minimum code length Lmin stored beforehand by repeating the steps. If the code length L[t] is smaller than the minimum code length Lmin, L[t] is stored as Lmin (step 507).

The set of documents P[t] with the minimum code length are then selected by repeating these sequential steps by C times (step 502). Since selection of the documents is done at random, the more optimum documents will be selected when the value of C increases.

The cluster generation step executes clustering, depending upon the similarity, of the set of documents P [t] selected by the leaf node selection step (step 508). Then, the non-selected remaining documents are assigned respectively to leaf nodes which are similar to the documents in the cluster. Thus, the cluster of the minimum code length Lmin is generated.

As above-mentioned, when the number of documents is more than the specific MAX number, the clustering is done at high speed even if a precision of similarity is decreased. When the number of documents is not more than the specific MAX number, the clustering is done in round robin among the documents.

The calculative quantity updating the cluster in this method is O(log n). However the re-construction of the cluster must be done periodically. This is because that since a document is added in sequence to the initially generated cluster, the generated cluster will be different from an ideal cluster.

As shown in FIGS. 6–9, the number of documents is 27 and the MAX is 4. Also, the documents are provided with respective numbers of 1–27. However, the differences of the similarity of the documents are irregular.

Figure 7:
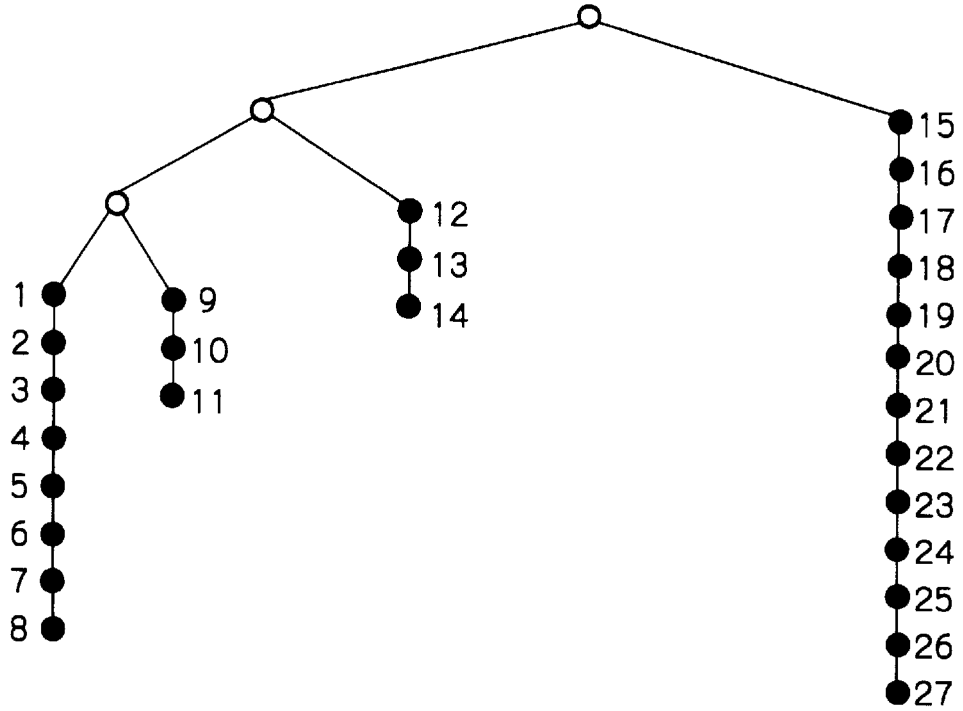
FIG. 7 shows a cluster diagram generated by the first step according to the embodiment of FIG. 4.

In FIG. 7 which shows a cluster diagram after the cluster generation function is once executed, the leaf node selection step repeats random selections of four documents, and the documents 1, 9, 12 and 15 with the minimum code length are selected. These four documents are clustered by the cluster generation step, and the non-selected documents 2–8, 10, 11, 13, 14 and 16–27 are assigned to a leaf node which is similar to the documents in the particular cluster. For example, the documents 16–27 are assigned to the leaf node of the document 15.

Figure 8:
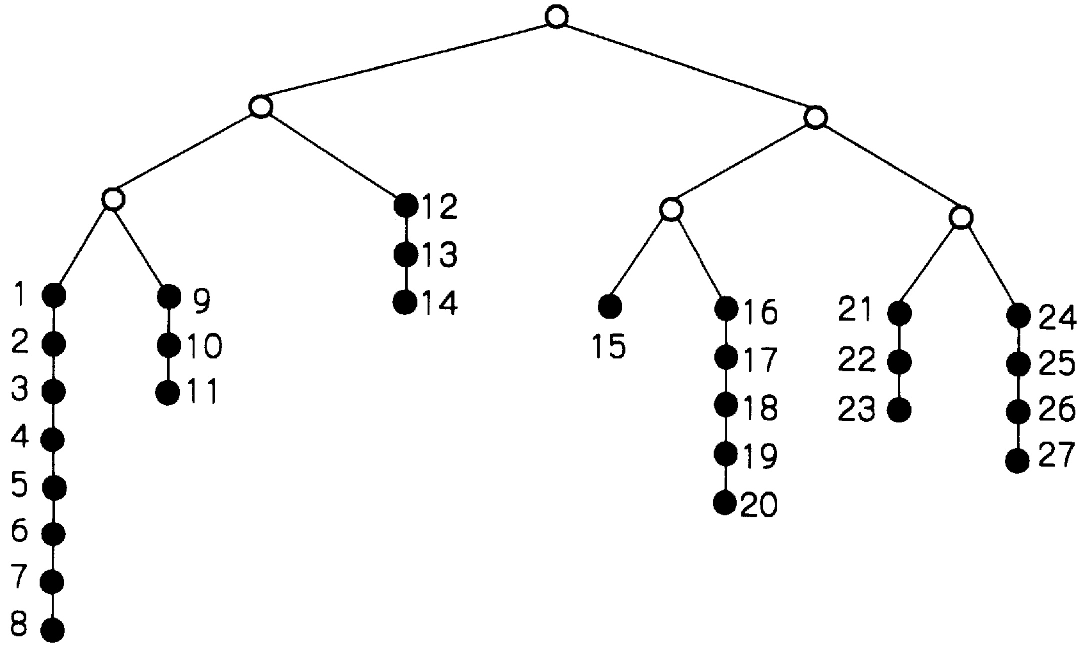
FIG. 8 shows a cluster diagram generated by the second step according to the embodiment of FIG. 4.

FIG. 8 indicates a cluster diagram when the cluster generation function is called by the input pointer of the leaf node to which the documents 15–27 are assigned. In the leaf node selection step, the four documents of 15, 16, 21 and 24 with the minimum code length are selected. Then, in the cluster generation step, these four documents are clustered, and the non-selected nine documents 17–20, 22, 23 and 25–27 are assigned to a leaf node which is similar to the documents 15, 16, 21 and 24. For example, the documents 17–20 are assigned to a leaf node of the document 16.

Figure 9:
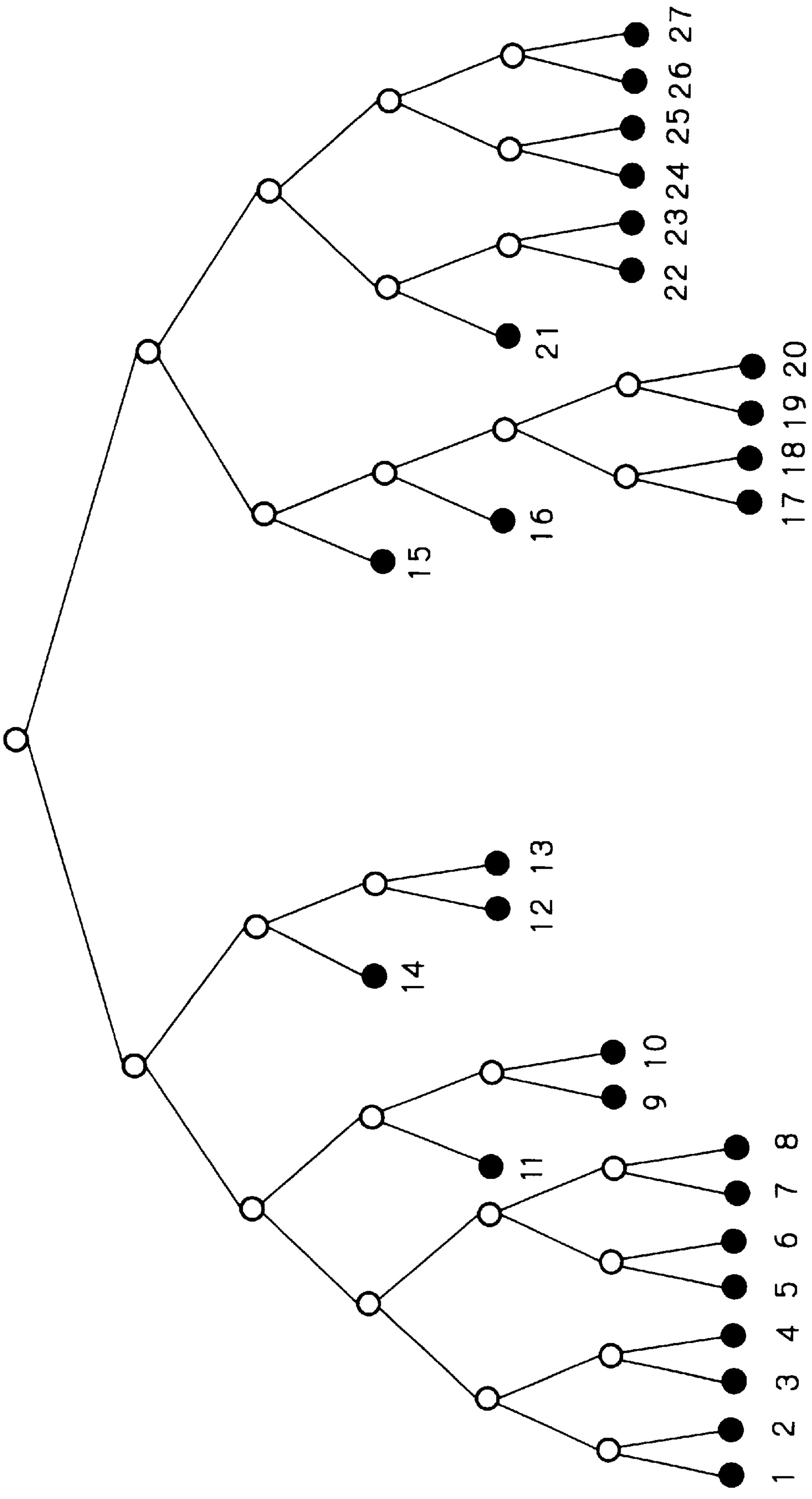
FIG. 9 shows a cluster diagram generated by the final step according to the embodiment of FIG. 4.

In FIG. 9 indicating a cluster diagram of finally generated cluster, it is understood that the documents located close to the leaf node have a high similarity. In contrast to the ideal cluster shown in FIG. 6, the irregular cluster is generated so that the precision of similarity between adjacent documents is slightly inferior. However since the cluster of documents need not have the exact similarity, it is an advantage that the clustering can be executed at a high speed.

The present invention provides a document retrieval apparatus which can generate a cluster of a massive number of documents by a low calculative quantity, and can provide for an update of the individual documents while keeping a form of the cluster. Thus, the clustering is at high speed.

Also, the present invention is to provide the document retrieval apparatus which can inform the user of any addition and update of the documents in real-time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A document retrieval apparatus connected through a network to a plurality of computers having documents, said apparatus comprising:

a contents database for storing index information of the respective documents;

a cluster database for storing a plurality of node information elements which are linked as nodes of a cluster with a hierarchical tree structure of the documents arranged based on similarity of the documents, each said node information element including end addresses where an update of the cluster generated by a modification or an addition of an individual document located at a lower side of the node is to be posted; and a control means for posting the modification or addition of the individual document to the end address in the node information element which encounters while following the link of the cluster when the cluster is updated.

2. The document retrieval apparatus of claim 1, wherein:

the node information element has a frequency table with weightings listing desired keywords which appear in the plurality of documents located at the lower side of the node, the individual document has a frequency table with weightings listing the keywords which appear in the individual document, the link of the cluster is followed by comparing the frequency table in the node information element with the frequency table of the individual document.

3. The document retrieval apparatus of claim 1, the network is the internet and the end address in the node information element is a mail address.

4. The document retrieval apparatus of claim 1, further comprising a user information database which includes a list of locations of the documents in which the user has an interest, and a list of domains indicating retrieving limits, for every end address.

5. The document retrieval apparatus of claim 1, further comprising a resource discovering engine collecting the documents automatically though the network.

6. A document retrieval apparatus including a database storing a plurality of documents, and a control means for constituting the documents in a cluster and retrieving the document, the control means comprising;

a leaf node selection means for random selecting a specific number of the plurality of documents as the documents assigned to leaf nodes, and clustering the selected documents;

a partial clustering means for assigning the remaining non-selected documents of the plurality respectively to the leaf node assigning one selected document to which each of the non-selected documents is similar; and a recursively clustering means for recursively repeating the operations of the leaf node selection means and the clustering means toward a direction of the leaf node of the cluster.

7. The document retrieval apparatus of claim 6, wherein the node selection means comprises means for random selecting the specific number of documents from the plurality documents, means for clustering the selected documents, means for assigning the remaining non-selected documents respectively to a leaf node assigning one document to which each of the non-selected documents is similar, and means for calculating the code length of the cluster, the leaf node selection means repeating at a specific frequency the operation of each of said means in order to select the specific number of documents so that the code length of a cluster is minimized.

8. The document retrieval apparatus of claim 7, wherein the code length of the cluster is the sum of an informational quantity L1=2k−1 necessary for clustering the documents where k is the number of the leaf nodes, and a code length $L2=\Sigma n_i \log p_i$ necessary for classifying the documents assigned to each leaf node where $n_i$ is the number of the documents assigned to the leaf node i and $pi=n_i/\Sigma_j n_j$ is a probability of selecting the documents of the leaf node i from the plurality of documents.

9. The document retrieval apparatus of claim 6, wherein the recursively clustering means instructs the recursively repeating of the operations of the leaf node selection means and the partial clustering means toward a direction of the leaf node of the cluster if the number of document assigned to the leaf node of the cluster is more than the specific number.

10. A clustering method for constituting a plurality of documents as a cluster, and retrieving a particular document, the method comprising:

randomly selecting a specific number of documents as the documents assigned to leaf nodes from the plurality of documents, and clustering the selected documents;

partially clustering and assigning the remaining non-selected documents of the plurality respectively to the leaf node assigning one selected document to which each non-selected document is similar; and recursively repeating the leaf node selection and the clustering toward a direction of the leaf node of the cluster.

11. The method of claim 10, further comprising calculating a code length of the cluster of selected documents, and repeating at a specific frequency the method in order to select the specific number of documents so that the code length of a cluster is minimized.

12. The method of claim 11, wherein the code length of the cluster is calculated by summing an informational quantity $L1=2k-1$ necessary for clustering the documents where k is the number of the leaf nodes, and a code length $L2=\Sigma n_i \log p_i$ necessary for classifying the documents assigned to each leaf node where $n_i$ is the number of the documents assigned to the leaf node i and $p_i=n_i/\Sigma_j n_j$ is a probability of selecting the documents of the leaf node i from the plurality of documents.

13. The method of claim 10, wherein recursively repeating of the leaf node selection and the partial clustering toward a direction of the leaf node of the cluster is continued if the number of document assigned to the leaf node of the cluster is more than the specific number.

* * * * *